United States Patent [19]

Berg

[11] 4,413,956
[45] Nov. 8, 1983

[54] WAVE PUMP APPARATUS

[76] Inventor: John L. Berg, P.O. Box 1282, Vallejo, Calif. 94590

[21] Appl. No.: 304,648

[22] Filed: Sep. 23, 1981

Related U.S. Application Data

[63] Continuation-in-part of Ser. No. 81,013, Oct. 1, 1979, Pat. No. 4,302,161.

[51] Int. Cl.³ .............................................. F03B 13/12
[52] U.S. Cl. ..................................... 417/333; 60/497; 60/505
[58] Field of Search .................................. 60/497–507; 417/330, 331, 332, 333; 290/53, 54

[56] References Cited

U.S. PATENT DOCUMENTS 4,076,463  2/1978  Welczer .............................. 417/331
4,091,618  5/1978  Jackson .............................. 417/333
4,302,161 11/1981  Berg .................................... 417/333

Primary Examiner—Allen M. Ostrager

[57] ABSTRACT

A wave pump apparatus includes a number of upstanding cylinders connected together by a subframe. Each cylinder mounts a float on the outside of the cylinder connected to a piston within the cylinder. The upstanding cylinders are spaced approximately a distance of half of an average wave length from the main floats of a particular wave pattern such that as certain floats are moving upwardly, other floats are moving downwardly. Each cylinder is connected to a chamber at the bottom thereof with an inlet valve and an outlet valve, such that as the piston in the cylinder is moving upwardly, it will draw in water, and as the piston moves downwardly in the cylinder, it will pump the water.

3 Claims, 11 Drawing Figures

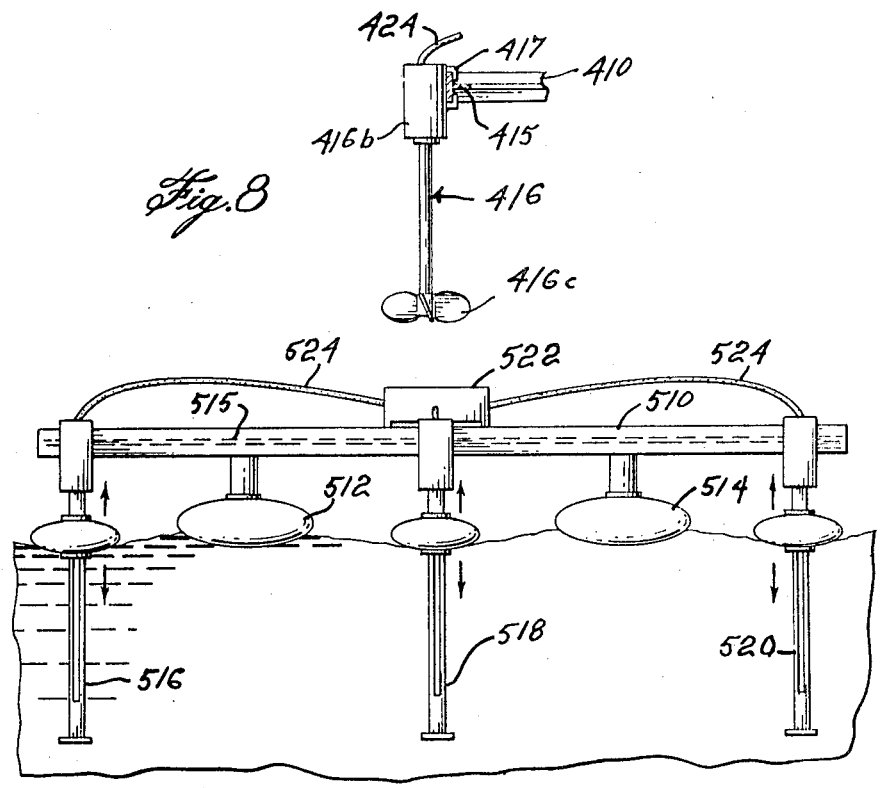
Fig. 8
Fig. 9
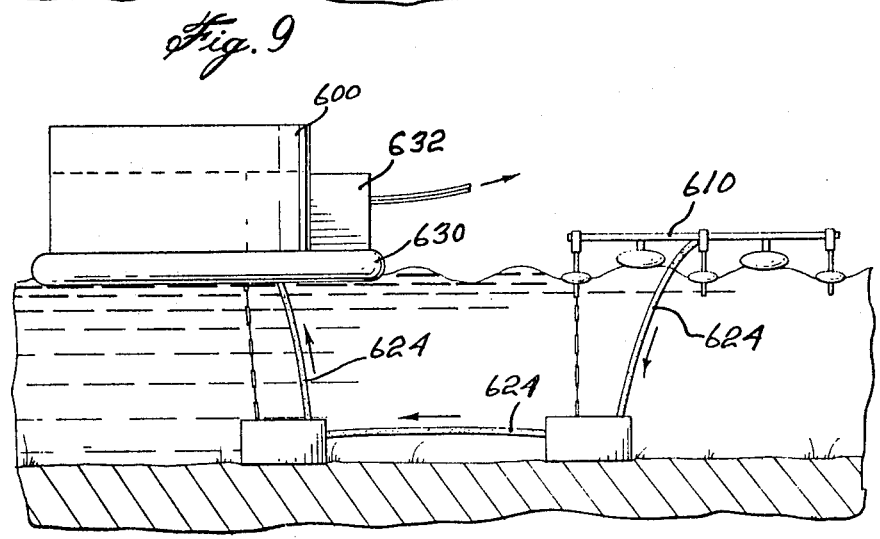
Fig. 11

WAVE PUMP APPARATUS

CROSS-REFERENCE TO RELATED APPLICATION

This application is a continuation-in-part of United States application Ser. No. 081,013, filed Oct. 1, 1979 now U.S. Pat. No. 4,302,161.

BACKGROUND OF THE INVENTION

1. Field of the Invention

The present invention relates to an apparatus for converting energy from wave motion to useful forms of energy, such as mechanical or electrical.

2. Description of the Prior Art

There have been numerous developments in the field of utilization of wave motion. An example is U.S. Pat. No. 610,013, issued Aug. 30, 1898. In that patent, a vertical cylinder and piston is provided, the piston being connected to a float adapted to follow the varying levels of a body of water caused either by tides or by wave motion. As the float is raised by the wave motion or by tide motion, the piston and the cylinder moves upwardly acting as a pump for pumping water from the body of the water to a higher level where the water can be stored for conversion into other types of energy such as for turning a generator.

SUMMARY OF THE INVENTION

It is an aim of the present invention to provide an improved system for converting the energy derived from wave motion into useful energy.

It is a further aim of the present invention to provide a system whereby wave pumps of the type described in U.S. Pat. No. 610,013 can be used with other elements to provide a commercially useful energy convertor.

A construction in accordance with the present invention includes a frame of the submersible type, with floats mounted on the frame and adapted to float the frame. At least a pair of floats are provided which are spaced apart one from the other a distance approximating the average wave length of a particular wave pattern. The floats are adapted to be moved relative to each other depending on the wave length of a wave pattern on the body of water. A plurality of wave pumps are provided on the frame with each wave pump including a vertical cylinder and a piston movable in the cylinder. A float on the exterior of the cylinder is directly connected to the piston, and a chamber communicates with the bottom of the cylinder including a one-way valve provided at an inlet into the chamber allowing water to be drawn into the chamber as the piston is moved upwardly in the cylinder. A second one-way valve is provided at the outlet of the chamber to allow water to flow through the outlet when the piston is moved downwardly in the cylinder.

Another embodiment of the present invention includes a super-structure type frame with floats mounted underneath the frame for supporting the frame as much as possible out of the water. A plurality of wave pumps are provided underneath the super-structure of the frame. Cylinder housings of the wave pump can act as sea legs for the super-structure in the case of submerging the complete structure below the sea level.

BRIEF DESCRIPTION OF THE DRAWINGS

Having thus generally described the nature of the invention, reference will now be made to the accompanying drawings, showing by way of illustration a preferred embodiment thereof, and in which:

FIG. 8 is a fragmentary side elevation of a detail of FIG. 7;

FIG. 9 is a side elevation illustrating yet another embodiment of the present invention;

FIG. 11 is a schematic side elevation of a particular application of the apparatus shown in FIGS. 5, 6, 9 and 10.

DESCRIPTION OF THE PREFERRED EMBODIMENTS

Figure 1:
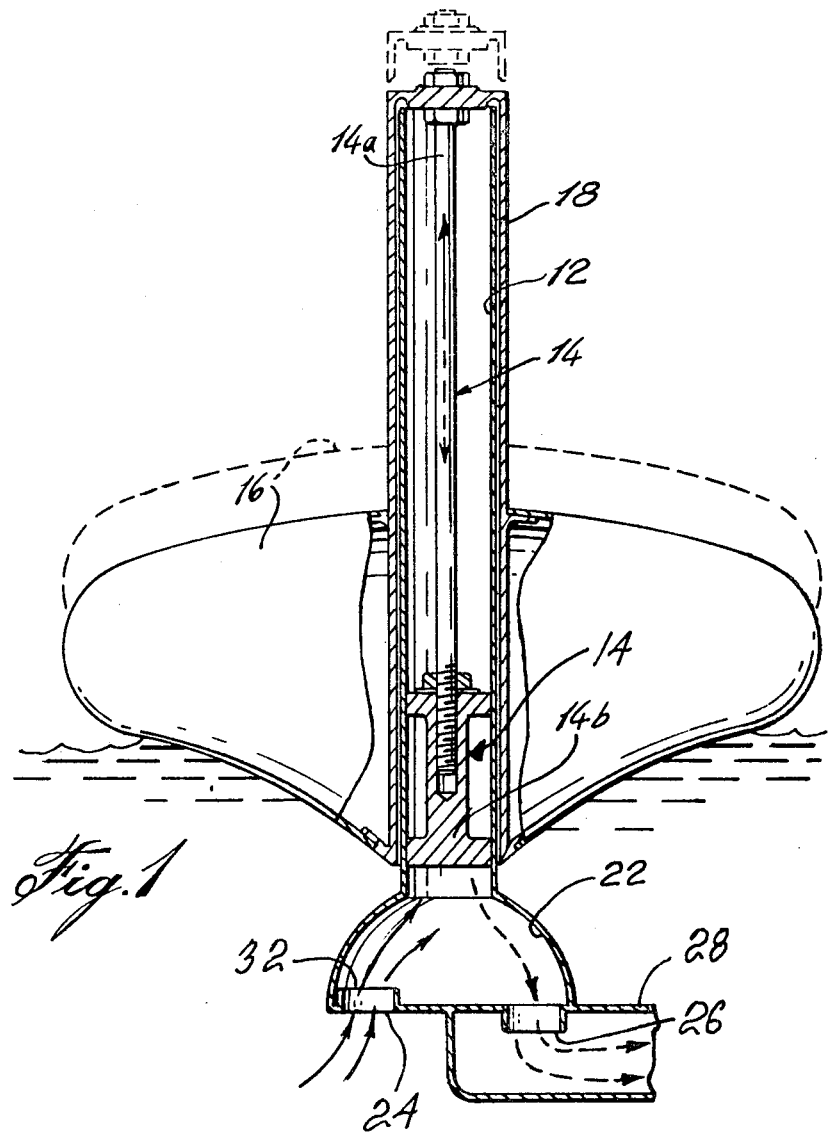
FIG. 1 is a fragmentary cross-sectional view of a typical pump in accordance with the present invention.
Figure 2:
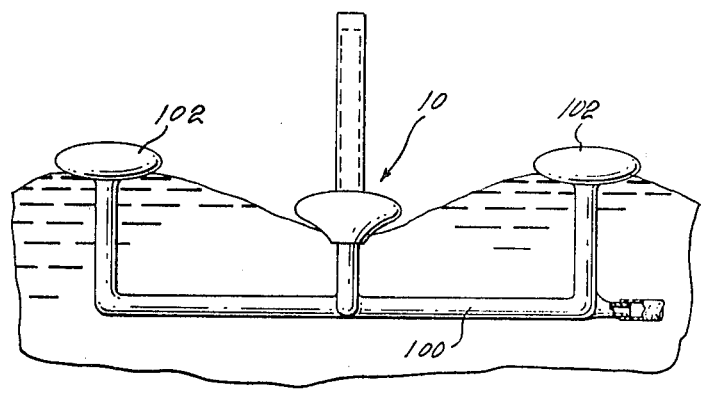
FIG. 2 is a schematic view of one embodiment of the submersible frame including floats and a water pump in accordance with the present invention.
Figure 3:
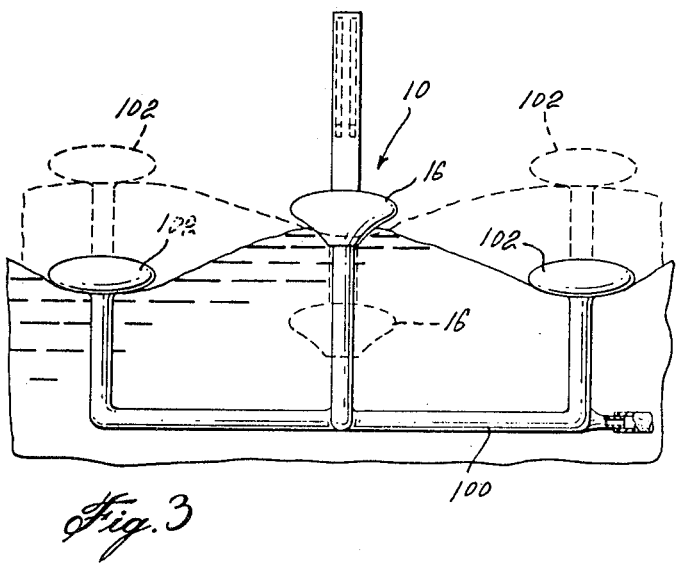
FIG. 3 is a similar view to FIG. 2, showing the device in a different operative position.

Referring now to FIGS. 1 to 3, there is shown a typical water pump including a cylinder and a typical water pump 10, including a cylinder 12, a piston 14 and a float 16.

In the case of FIG. 1, the float 16 includes a bore to allow the cylinder 12 to pass therethrough with a bridging member 18 connected directly to the piston 14. The float 16 is connected to the piston 14 by means of a bridge device 18 connected at the top of the cylinder 12 by means of a rod 14a to the piston 14 including piston head 14b. The piston 14 includes a piston rod 14a and a piston head 14b, the bottom of the cylinder 12 communicating with a chamber 22. Chamber 22 includes an inlet 24 and an outlet 26 which communicates with a discharge pipe 28.

In operation, the cylinder 12 would be fixed to a submersible frame 30. As a wave passes the device, the float 16 floats upwardly with the level of the water on the wave thus pulling the piston 14 upwardly, causing water to enter the chamber 22 through the inlet 24 and the valve 32. Valve 32 is a one-way valve and a similar valve 34 is provided at the outlet. The water will, of course, be drawn into the cylinder 12 partly up the cylinder, and since the valve 34 would in this case be closed, no water would be seeping back from the discharge pipe 28. As the wave passes the device, of course the float moves downwardly with the level of the water forcing piston 14 to push the water in the chamber 22 through the outlet 26 and thus through the valve 34 and into the discharge pipe 28.

Figure 4:
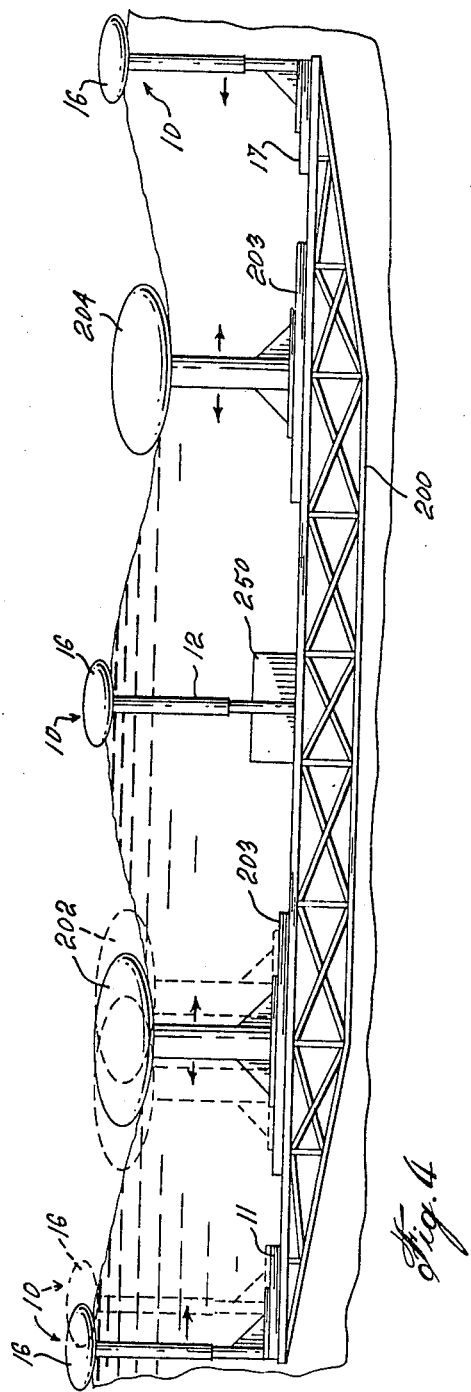
FIG. 4 is a schematic side elevation of another embodiment of the present invention.

On the other hand, a structure such as shown in FIGS. 2 and 3 and 4, might include a submersible frame 100 which includes a pair of floats 102 and mounting a plurality of water pumps 10 as described in FIG. 1. The floats 102, which are fixed to the submersible frame 100, are placed apart a distance equal to the average wave length or a multiple thereof of a particular wave pattern common in a particular area. The floats 102 would be on the crest of the waves while the floats 16 of the water pumps 10 would be in the valleys between the waves and vice versa. The water being pumped by the water pump can be passed to a higher level reservoir for storing hydroelectric energy.

FIG. 4 shows a more sophisticated version of a submersible frame 100. The frame in FIG. 4 is identified as 200 and includes an open steel structure with plenty of open spaces between the beams and struts to allow water to pass freely. The frame 200 includes floats 202 and 204 spaced apart longitudinally the average distance of the average wave length of a wave as a multiple of a particular wave pattern. The floats 204, for instance, could be mounted on tracks 203 and adjustable relative to the floats 202 to be synchronized with a particular wave length at any given time. As shown in the drawings, floats 202 could likewise be adjustable on tracks 203.

A plurality of wave pumps 10 are mounted to the frame 200, as shown in the drawing of FIG. 4. Each of the wave pumps 10 can be adjusted on tracks 11 provided on the frame 200 so that it is exactly a half wave length from the floats 202 and 204 so that as in the earlier described embodiments, the float 16 of the wave pump 10 will be at the crest or valley of the waves when the floats 202 and 204 are respectively at the valley or crest of the waves. Likewise, float 16 can be adjusted in relative distance from the float 204 by moving it along track 17.

A generating unit 250 is provided on the frame 200 for generating electricity or other forms of energy and would be in communication with the individual water pumps 10.

It should be noted that the effective height of the floats 202 and 204 above the frame should be approximately the height of the waves, such that when the floats 202 and 204 are riding respective crests of waves, the frame is still submersed below the level of the valleys to allow the floats 16 on the wave pumps 10 to reach their full bottom stroke. Of course, the cylinders 12 of the water pumps 10 must be high enough such that, when the floats 202 and 204 are in the valleys, the cylinders 12 still project above the wave crest.

Figure 5:
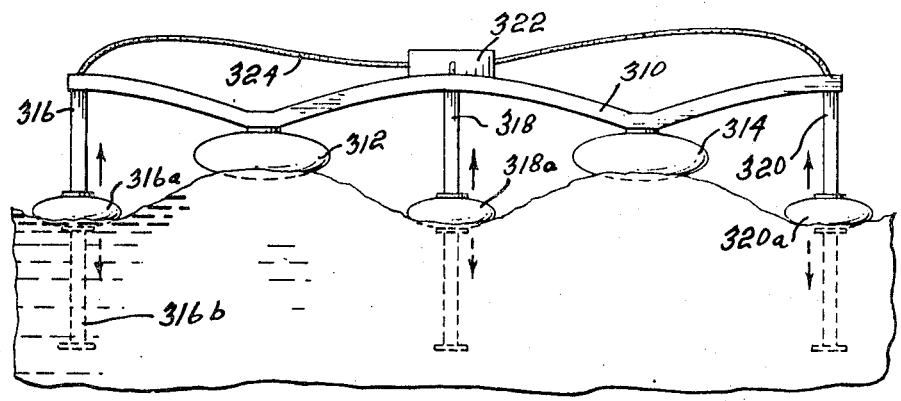
FIG. 5 is a schematic side elevation of yet another embodiment of the present invention.
Figure 6:
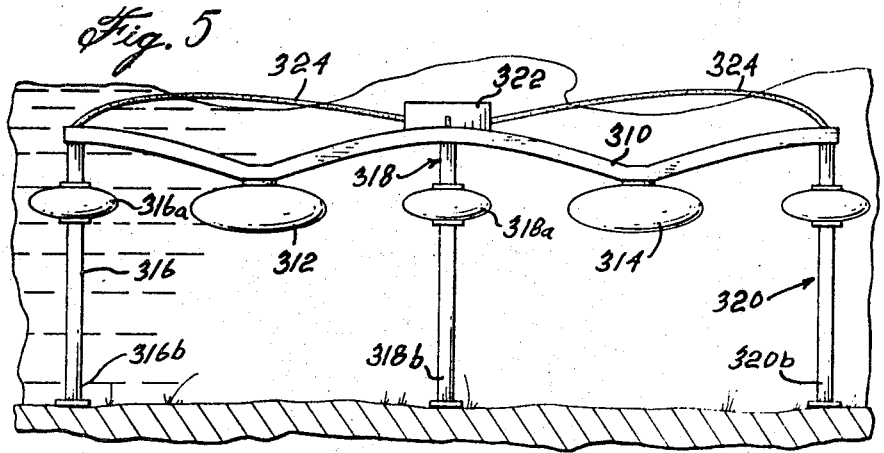
FIG. 6 is a schematic side elevation, similar to FIG. 5, showing the apparatus therein in a different operative position.

It has been found that it would be preferable to have the frame as a super-structure clear of the water in order to avoid the accumulation of barnacles and other debris which can increase the weight of a submersible frame. Accordingly, one embodiment of a super-structure type frame is illustrated in FIGS. 5 and 6, including a light-weight super-structure frame 310 mounting fixed floats 312 and 314 in a spaced-apart relationship which could conceivably be a full wave length apart. However, since it is extremely difficult to adjust for any given particular wave pattern, the distances between the floats 312 and 314 and other main floats on the super-structure frame would be at best approximate distances.

As in the previous embodiments, the wave pumps 316, 318 and 320 are illustrated, including vertically displaceable floats 316a, for instance, moving in a vertical direction on a leg 316b. The leg 316b would be in the form of a structural casing, and a pump structure similar to that described in relation to FIG. 1 would be provided within the leg 316b. The same structure would be repeated in legs 318 and 320. On the top of the super-structure, a generator 322 would be provide to which the water would be pumped through flexible pipes 324 to operate the generator. Of course, the water is being pumped by the various wave pumps 316, 318 and 320 through the generator 322 to operate this generator.

It has been contemplated that the apparatus could be submerged completely so that the wave pump legs 316b are supporting the structure on the sea bed floor as shown in FIG. 5. In this case, the floats 312 and 314 would be partially flooded in order to lower the super-structure into a submersed position with the sea legs 316b, 318b and 320b on the sea bed. This position could be assumed in case of severe weather conditions on the ocean, for instance. The floats 316a and 318a, which are not flooded, would keep the apparatus in a stabilized position in order to weather a storm.

Figure 7:
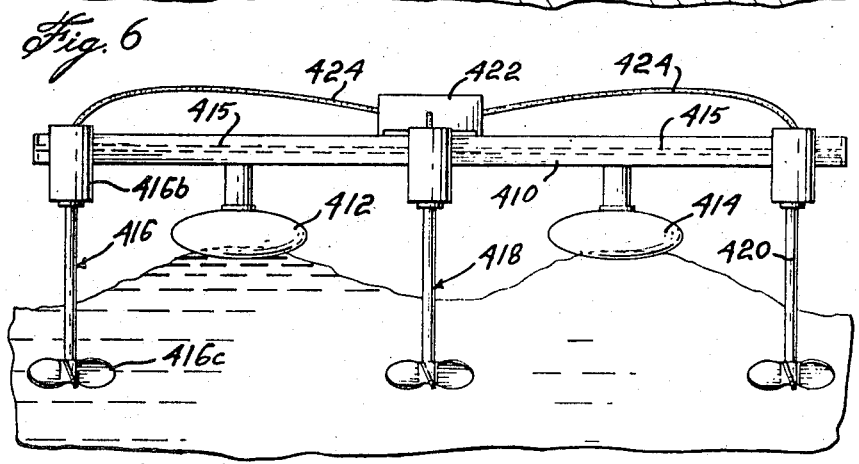
FIG. 7 is a schematic side elevation of still another embodiment of the present invention.

In FIG. 7, there is shown another embodiment of the present invention which would include a super-structure frame 410 having floats 412 and 414 riding in tracks 415 provided in the super-structure 410. This would allow the distance between the various floats 412 and 414 to be adjustable such as in the embodiment shown in FIG. 6.

Also in this particular embodiment, the wave pumps are discarded for propeller driven shafts which could be operated by the vertical displacement of the water in a wave situation. The propeller shafts 416, 418 and 420 would operate generators 416b, for instance, and the shaft per se would be driven by the propeller 416c. The super-structure 410 would mount a transformer 422 connected to the generators 416b by electrical wires 424.

The wave pump 416 could be mounted on a rail 415 by means of sliding brackets 417, as shown in FIG. 8.

The embodiment shown in FIG. 9 is similar to FIGS. 5 and 7 in that the super-structure 510 has adjustable floats 512 and 514 which can be moved on tracks 515. Similarly, the pumps 516, 518 and 520 could be adjusted on similar tracks.

Figure 10:
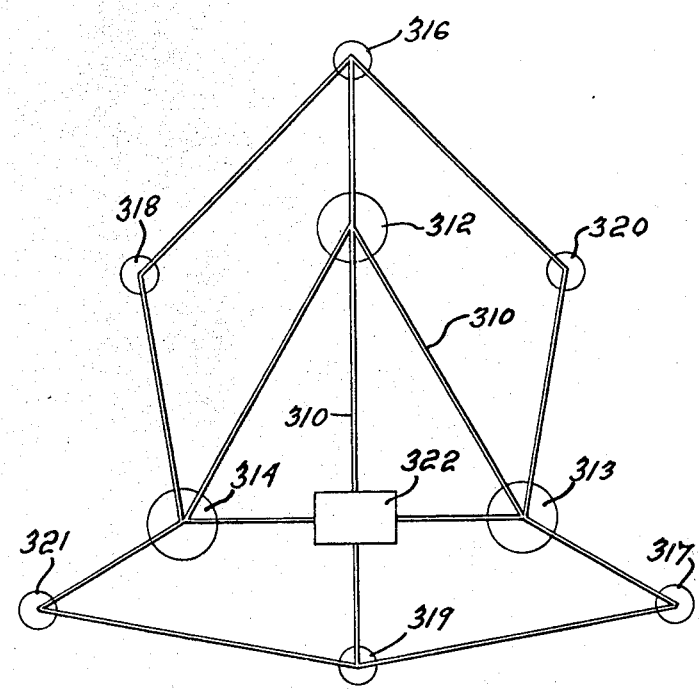
FIG. 10 is a schematic top plan view of an embodiment of the present invention.

It is interesting to note that in the embodiment shown in FIG. 10, none of the floats 312, 313 or 314 are arranged in a triangular arrangement as shown in the drawing, while the wave pumps 316, 318, 320, 321, 319 and 317 are arranged such that no one wave pump is in line with any two main floats 312, 313 and 314. This arrangement will allow to take advantage of waves of any size coming from any particular direction.

FIG. 11 shows a floating reservoir 600 which would be filled by means of the wave pump system 610 shown in the drawing, while water could be pumped to the reservoir by means of the conduit 624 which would fill the reservoir for providing a reserve in the case of calm conditions. Once the reservoir, which floats on pontoons or other floats 630, is filled and the ocean is calm such that the wave pump apparatus 610 does not operate, the water would be allowed to run through a generator 632 to create electricity.

I claim:

1. A wave pump apparatus comprising a super-structure type frame, floats mounted on the frame below the super-structure and adapted to float the frame, the floats including at least a pair thereof which are spaced apart one from the other a distance approximating the average wave length of a particular wave pattern of a body of water, a plurality of wave pumps provided below the super-structure, each wave pump including a cylinder, a piston movable in the cylinder, a float on the exterior of the cylinder directly connected to the piston, chamber means communicating with the cylinder, a generator provided on the super-structure and communicating with the wave pumps, and each wave pump adapted to supply water under pressure to the generator for turning the generator.

2. A wave pump apparatus as defined in claim 1, wherein the wave pump cylinders are provided within sea leg casings adapted to support the apparatus on the sea bed in the case of submerging the apparatus, wherein the floats can be partially flooded for lowering the super-structure below the sea level.

3. A wave pump apparatus as defined in claim 1, wherein the wave pumps are located on the frame such that no one wave pump is aligned with any two floats for the frame.

* * * * *